March 18, 1941. A. R. THÖRNBLAD 2,235,657
PARACHUTE
Filed Feb. 22, 1938 3 Sheets—Sheet 3
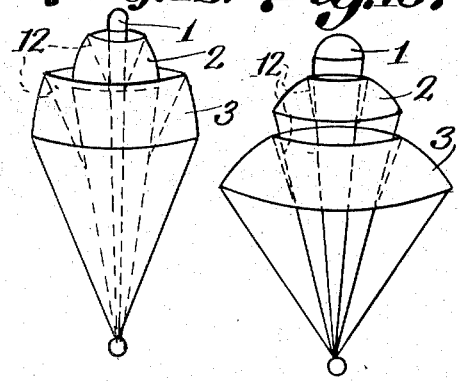
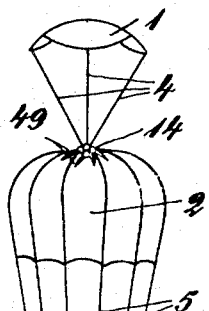
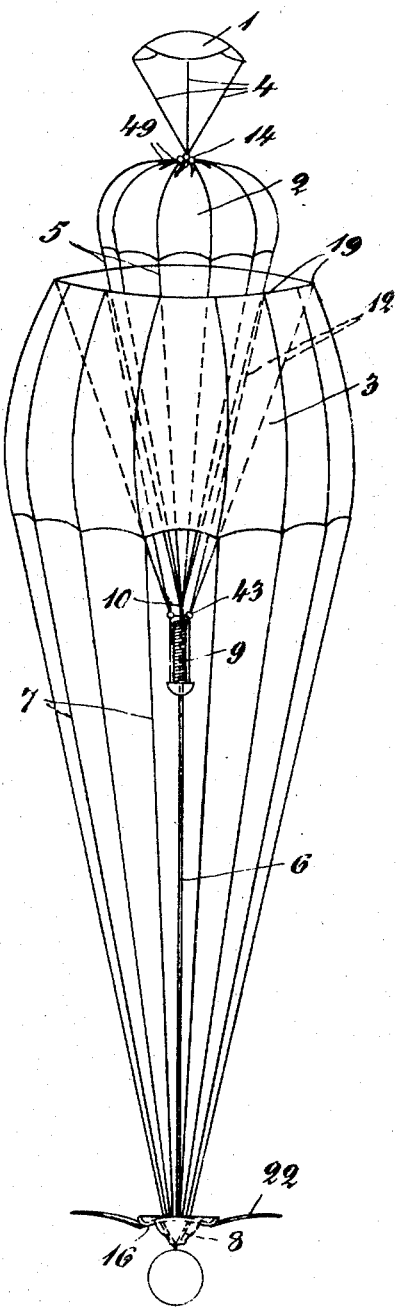
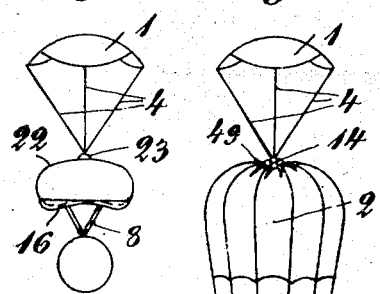
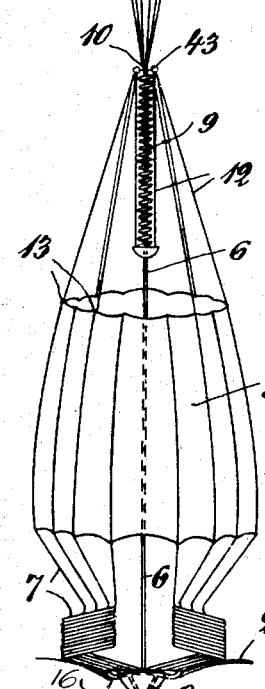
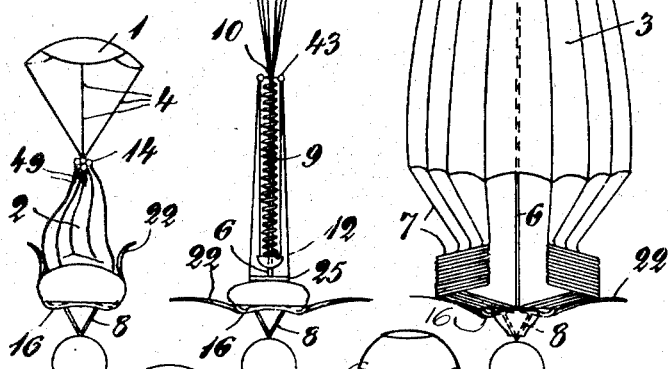
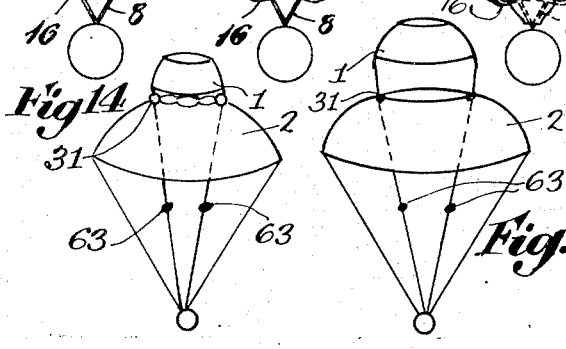
INVENTOR
AXEL RAOUL THÖRNBLAD
By: Haseltine, Lake & Co.
ATTORNEYS Patented Mar. 18, 1941

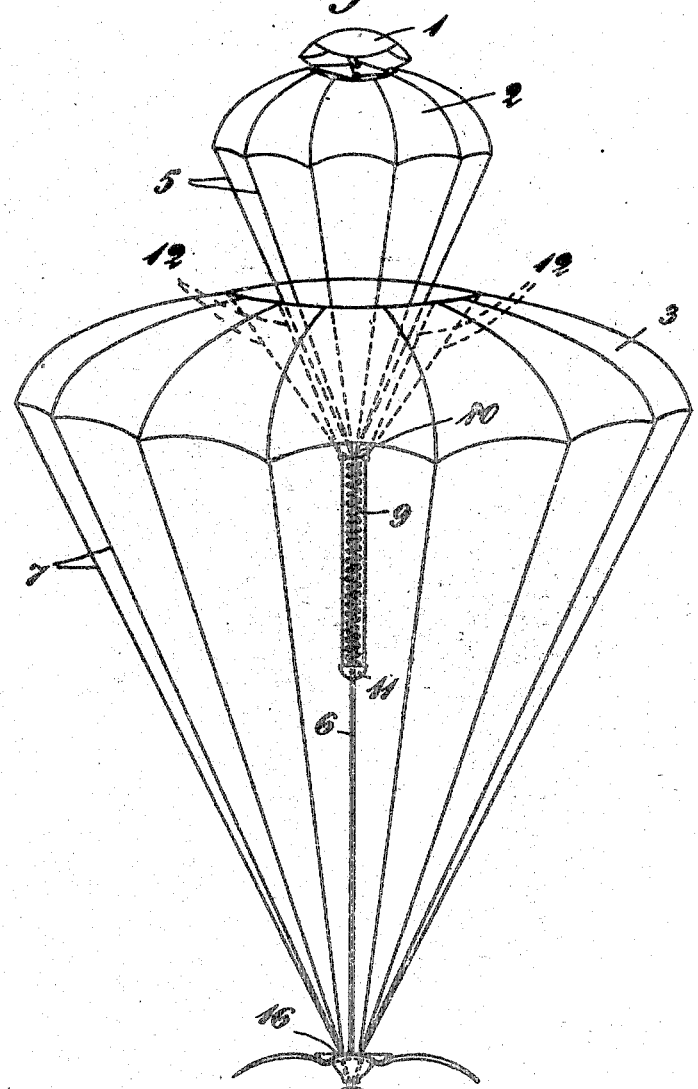
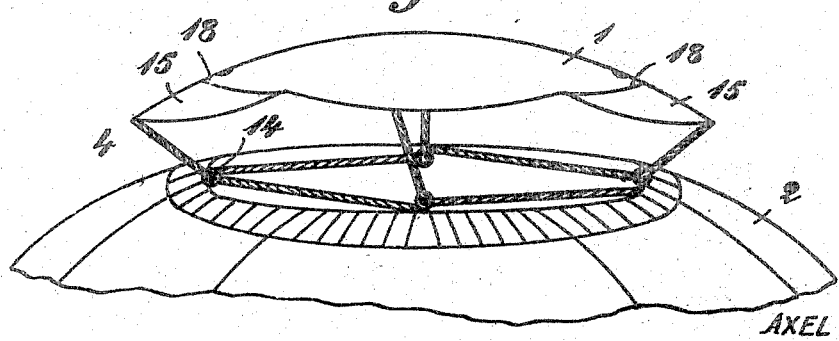

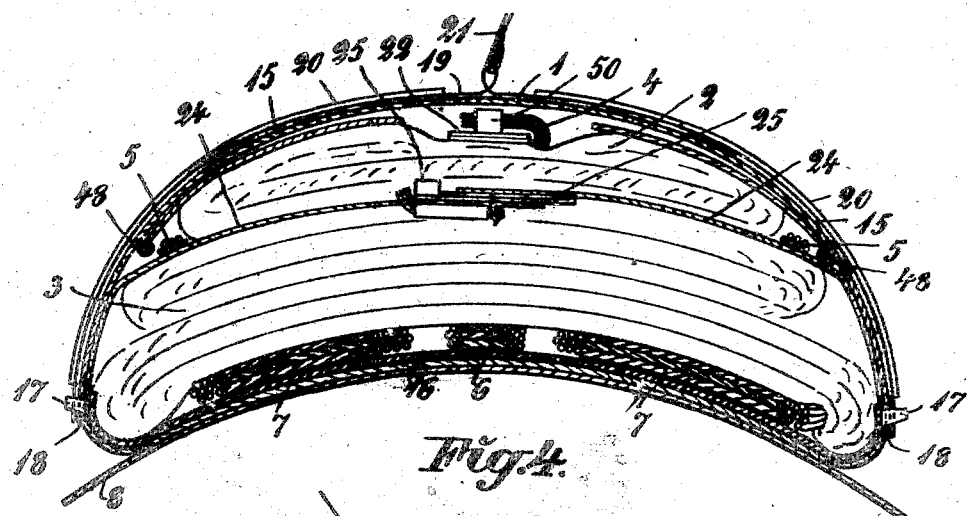
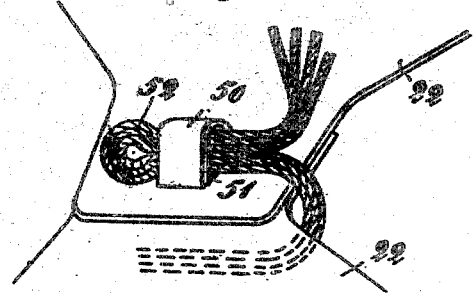
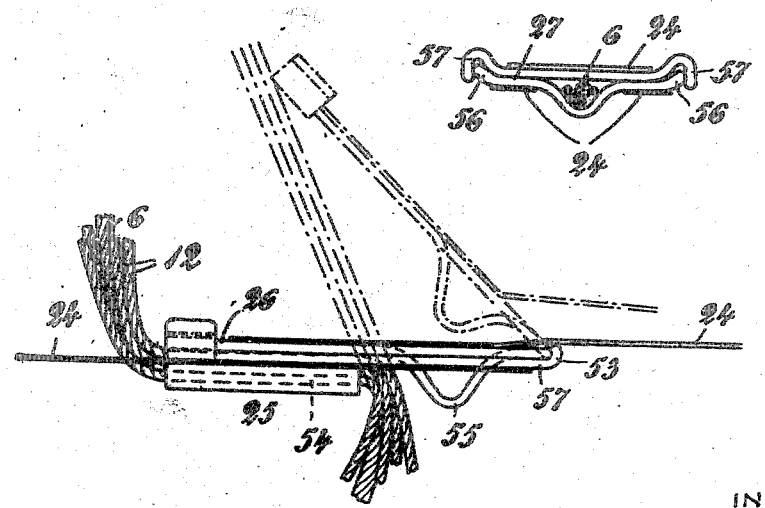

2,235,657

UNITED STATES PATENT OFFICE 2,235,657

PARACHUTE

Axel Raoul Thörnblad, Stockholm, Sweden

Application February 22, 1938, Serial No. 191,845
In Sweden June 29, 1937

20 Claims. (Cl. 244—152)

The present invention relates to parachutes and relates more particularly to parachutes for air craft moving at very high speeds, say at speeds ranging from 200 to 300 miles per hour.

It is a primary object of my invention to provide a parachute for rapidly moving air craft which is capable of reducing, in a minimum of time, a great initial speed to a safe landing speed without causing undue shocks on the fabric of the supporting surfaces or on the load.

It is a further object of the invention to provide a parachute for high initial speeds, the weight of which is considerably less than the weight of previously known parachutes having similar operating characteristics.

Another object of the invention is to provide in a parachute consisting of several component parachutes or supporting elements separate means insuring the withdrawal of the individual supporting elements from the pack in a predetermined sequence.

A further object of the invention is to provide means in a composite parachute whereby an already released supporting element can be utilized for pulling out a following supporting element from the pack.

Still another object of the invention is to provide a composite parachute in which upon release the initially active supporting element or pull-off parachute is positively ejected from the pack.

With these and other objects in view I have provided a novel parachute which is characterized substantially in that its supporting surface is divided into a plurality of supporting elements each equipped with an individual system of suspension lines, which supporting elements during the unfolding of the parachute cooperate to effect an automatic equalization of the pressure of the air on the parachute. According to a preferred embodiment of my invention a composite parachute comprising a main parachute and an auxiliary parachute has been provided, in which the main parachute is equipped with means which operate automatically in dependency of the speed of movement of the parachute to effect a complete unfolding thereof only when the speed has been reduced to a value that is sufficiently low with regard to the shock of opening, whereas the auxiliary parachute is so arranged and dimensioned as to effectively aid in rapidly reducing the speed to the value necessary to permit unfolding of the main parachute.

The invention will now be described in detail having reference to the drawings attached to this specification and forming part thereof, in which Figure 1 shows schematically a parachute according to the preferred embodiment of my invention in entirely unfolded condition, Figure 2 shows the top portion of the parachute according to Figure 1 on a larger scale, Figure 3 shows a vertical section through the parachute in packed up condition, Figures 4 to 6 show details of the parachute container or pack on a larger scale, Figures 7 to 11 show schematically different phases of the unfolding of the parachute according to Figures 1 to 6, Figures 12 to 15 show further modifications of the parachute illustrated in Figures 1 to 11.

The improved parachute illustrated in Figures 1 to 11 is composed of three supporting elements or component parachutes 1, 2 and 3 which in the unfolded condition of the parachute are positioned one above the other. The uppermost supporting element 1 or pull-off parachute, which is designed as a cover for the pack or container adapted to house the other supporting elements in packed up condition, serves to pull out the intermediate supporting element 2 from the parachute pack. For this purpose the uppermost supporting element or pull-out parachute 1 connects with the summit of the intermediate parachute 2 by means of its suspension lines 4, said suspension lines being fastened at their lower ends to the rim of a central opening provided in the intermediate parachute and passed intermediate their ends through eyelets 14 secured to said rim at points spaced from the fastening points. The intermediate parachute 2 is designed to brake the speed of fall during the initial phases of the unfolding of the parachute assembly. For convenience said parachute will therefore in the following be termed the braking parachute. The suspension lines 5 of the braking parachute 2 extend from the base edge of the parachute to the upper end of a common suspension line string 6 which serves to connect the suspension lines of the braking parachute directly to the harness 8 of the parachutist. The lowermost supporting element or main parachute 3, which is mainly relied upon to retard the speed of fall during the last part of the retardation period, is connected directly with the harness 8 by means of suspension lines 7 which converge downwardly from the base rim of the main parachute to fastening points in the harness.

Preferably, the suspension lines 5 of the braking parachute 2 have a length at least equal to the diameter of the base opening of the braking parachute, while the combined length of the suspension lines 5 and the suspension line string 6 is so determined with regard to the radial dimension of the fabric of the main parachute and the length of the suspension lines 7 that during and after the unfolding period the braking parachute and main parachute will take up favourable mutual positions. During the earlier phases of the unfolding, when the speed of the air current is still very high, the braking parachute and the main parachute offer a smaller resistance to the air current and they will obtain their full carrying capacity only when the stresses on the parachute caused by the air pressure have been reduced to a safe value.

In the parachute design illustrated in Figures 1 to 11 the supporting surfaces of the top element, the intermediate element 2 and the lowermost element 3 are so shaped and arranged that during the unfolding period the supporting surface of the parachute grows peripherally. The top element constitutes the smallest and the bottom element the largest one of the supporting elements. After release from the pack the supporting elements place themselves in such mutual positions that the top part will constitute the uppermost and the bottom part the lowermost supporting element.

The suspension line string 6 of the braking parachute is surrounded at its upper portion by a helical spring 9 the upper end of which is secured to the string 6 at the point of junction 10 between the string 6 and the suspension lines 5. Secured to the lower movable end 11 of the helical spring 9 are a number of auxiliary lines 12. The auxiliary lines 12 pass through fixed eyelets 43 provided at the junction point 10 and from there extend to the top edge 13 of the main parachute 3. The auxiliary lines 12 and the spring 9 have a regulating influence on the main parachute 3 during the unfolding of the latter, in that said members prevent the main parachute from remaining too long in the elongated position shown in Figure 11 which on account of the provision of the large central opening the main parachute has a tendency to take up when the air current has a great velocity with respect to the parachute. The auxiliary lines 12 and the spring 9 thus strive to give to the main parachute 3 a flatter and more effective carrying position according as the speed of the parachute with respect to the air is reduced due to the retardation, so that the main parachute will present its greatest relative resistance to the air when during the descending period it moves downwards at a uniform speed. In other words, the auxiliary lines 12 in combination with the helical spring 9 serve, during the unfolding or retardation period respectively, as a kind of regulating means for automatic regulation of the shape and size of the main parachute in dependency of the velocity of the air current.

As will be seen from Figure 3, which as already mentioned shows a vertical section through the parachute assembly in packed up condition, the pull-off parachute 1 encloses the other parts of the packed up parachute and forms the upper covering portion of the parachute pack. By means of a number of flaps 18, in the shown example two flaps, the pull-off parachute is detachably secured to the preferably rigid bottom 16 of the pack or container, said bottom being in turn secured to the harness 8. The securing means consists of two studs 17 fixed to the bottom 16 and adapted to cooperate with corresponding holes in the fastening flaps 18, and of a locking wire 19 the free ends of which pass through transverse holes in the studs 17 outside of the flaps 18, the ends of the wire forming a kind of pins which prevent the flaps from sliding off the studs. For protection against damage the locking wire 19 is enclosed in diametrically arranged slides 20 provided by fabric tapes stitched onto the upper side of the pull-off parachute 1. Intermediate its ends the locking wire 19 is provided with an eye to which one end of the release cord 21 is secured, the other end of said cord being preferably fastened to the aircraft. Said cord permits the release of the parachute through the withdrawing of the locking wire. Right opposite the fastening flaps 18 the pull-off parachute 1 is provided with two diametrically arranged strengthening ribs, preferably of metal, which ribs are stitched to the fabric and serve as a support for two semi-rigid supporting or ejecting flaps 15 which are hinged to the strengthening ribs at 48, said semi-rigid flaps 15 in the packed up condition of the parachute being folded in under the central body portion of the pull-off parachute 1 against the action of springs provided at the points of articulation, said spring actuated ejecting flaps 15 having for their primary duty to cause the pull-off parachute 1 to become positively ejected from the parachute pack immediately upon the withdrawal of the locking wire 19, the fastening flaps 18 then sliding off the studs 17. In their folded out position the spring actuated ejecting flaps 15 serve to increase the carrying surface of the pull-off parachute.

Under the pull-off parachute 1 the braking parachute 2 is packed in folded up condition, the braking parachute being separated from the pilot parachute by two primary retaining flaps 22 of fabric, said flaps being fastened to the sides of the pack. The lower one of said retaining flaps 22 is provided at its end with an eyelet 50 of fabric (see Figure 4) which is passed through an aperture 51 formed in the end of the upper retaining flap, and the eye is retained in the aperture by a loop 52 formed on the suspension lines 4 of the pull-off parachute, said loop being threaded into the eyelet.

The main parachute 3 is packed up immediately below the braking parachute 2. The main parachute is kept separated from the braking parachute by secondary retaining flaps 24 extending from the pack, said flaps forming also a supporting bottom for the suspension lines 5 of the braking parachute. The secondary retaining flaps 24 are held together by means of a locking mechanism 25. Said locking mechanism is shown in detail in Figures 5 and 6. It consists of an upper plate 26 of metal secured to the upper one of the flaps 24, and of a bottom plate 27, also of metal, which is secured to the lower one of the flaps. The upper plate 27 is provided at the free end of the secondary flap 24 to which it is fastened with a central slot, the two arms surrounding the slot being provided at their free ends each with a bent up edge 53 against which the corresponding edge of the upper plate 26 is adapted to rest. The slot in the bottom plate is continued by a depressed channel 54 in the remaining portion of the plate. Through said channel the central string 6 and the auxiliary lines 12 are passed. A bow-shaped portion 55 of the upper plate 26 projects into the slot in the lower plate 27 and serves to clamp the string 6 and the auxiliary lines 12 between the two plates 26 and 27. At the end opposite to the bent up edges 53 the lower plate is provided with two bent up resilient side portions 56 adapted to cooperate with corresponding bent down resilient side portions 57 provided on the upper plate 26, the cooperating resilient side portions serving to hold the upper and lower plates together with a certain spring power when the two plates occupy the locking position shown in full lines on the drawings.

The portion of the string 6 extending below the locking mechanism 25 is packed centrally on the bottom 16 of the pack, as shown in Figure 3. The suspension lines 7 of the main parachute 3 are placed on the bottom 16 laterally of the central string 6.

The release of the parachute from the pack is initiated through a pull in the release cord 21 causing the locking wire 19 to be withdrawn from the holes in the studs 17 and from the slides 20, the fastening flaps 18 and therewith the entire pull-off parachute 1 being hereby released from the pack or container. The spring actuated semi-rigid flaps 15 provided on the pull-off parachute 1 aided by the air current then cause the pull-off parachute to become immediately ejected from the parachute pack. The flaps 15 in their unfolded condition also serve to increase the carrying surface of the pull-off parachute. The pressure of the air current on the pull-off parachute causes the suspension lines 4 of the latter to become immediately stretched causing the loop 52 on the suspension lines to be pulled out of the fabric eyelet 50, thus disengaging the primary retaining flaps 22 from each other, so that the braking parachute can now be pulled out of the pack with its top end 49 drawn together by the suspension lines 4 of the pull-off parachute 1. Said phase of the unfolding of the parachute is illustrated in Figures 7 and 8. After the braking parachute 2 has become completely pulled out by the pull-off parachute 1 and has begun to unfold, Figure 9, the braking parachute 2 stretches the suspension line string 6 through the intermediary of its suspension lines 5. This causes the resilient connection between the two plates 26 and 27 of the locking mechanism 25 to be released, the upper plate 26 being caused to swing about the bent-up edges 53 of the lower plate 27 under the action of the stretching of the suspension line string 6 and of the tension in the primary retaining flaps 24, as indicated in Figure 5 with dot and dash lines, whereby the secondary retaining flaps 24 are released from each other. This uncovers the main parachute 3, permitting the latter to be pulled out by the braking parachute 2 through the intermediary of the auxiliary lines 12 (Figure 10). The pull in the auxiliary lines causes the helical spring 9 to become compressed. The tension in the helical spring in combination with the pressure from the air current causes the main parachute, after it has been pulled out of the pack, to be immediately moved up to the position shown in Figure 11, in which the helical spring 9 is compressed anew, this time to permit the main parachute to take up its elongated partly inoperative position under the action of the air current. According as the speed of the parachute with respect to the air decreases the spring 9 resumes more and more its extended position, the upper edge 13 of the main parachute 3 being thereby drawn closer to the lower edge thereof. This adjustment increases the tendency of the main parachute to assume, upon a decrease in the speed of the air current, its fully unfolded or flat shape as shown in Figure 1, i. e. its position of full carrying capacity or its position of descent. At the same time the braking parachute unfolds fully, the top aperture 49 thereof, which was initially closed, then opening up completely, compare Figures 8 to 11. The suspension lines 4 of the pull-off parachute are at the same time shortened so that the pull-off parachute is brought closer to the braking parachute 2, filling out the top opening of the latter whereby the carrying capacity of the parachute assembly is further increased.

The invention is, of course, not limited to the embodiments described above but can be modified in many different ways without receding from the idea of the invention. Various further embodiments of the invention are shown schematically in Figures 12 to 15, said embodiments being shown in two different operating positions, viz. in the position of reduced carrying capacity and in the final position of full carrying capacity.

In Figures 12 to 15 are illustrated embodiments of parachutes provided with separate auxiliary means designed to have a regulating effect on the shape and position of the component parachutes during the various phases of the unfolding of the parachute assembly.

In the embodiment according to Figures 12 and 13, the auxiliary means consist of lines, tapes or the like extending from the top end of the respective component parachutes. The other ends of the auxiliary lines can be secured either to the auxiliary lines of a parachute positioned higher up. The auxiliary lines can also be connected with the system of suspension lines and with the harness respectively in other manner. The auxiliary lines are so dimensioned with respect to their length as to be able to exert a checking or pulling effect on the top ends of the parachute bodies during the earlier phases of the unfolding of the parachute. By making the auxiliary lines resilient, as shown in Figures 12 and 13, the various parachutes can be made to take up more favourable positions during the unfolding period than would be possible if using suspension lines of invariable length.

According to Figures 14 and 15 the auxiliary means consist of rings 31 which are fastened to the top end of a lower parachute 2 and embrace the suspension lines of an upper parachute 1. Secured on the suspension lines of the last mentioned parachute are balls 63 which upon the pulling out of the parachute 1 from the pack engage with the rings 31, rendering it possible for said parachute by means of its suspension lines to pull out the parachute 2 from the pack. As soon as the parachute 2 has been pulled out, it is moved upwards under the action of the air current, the rings 31 then sliding upwards along the suspension lines of the uppermost parachute 1 while partly removing the initial drawing together of the top opening of the parachute 2. The top opening provided in the parachute 2 can open up completely only when the upper parachute 1 takes up its fully unfolded position.

Having now fully described my invention, I claim:

1. A composite parachute adapted for release at great initial speeds comprising in combination, a main parachute shaped or arranged respectively as to strive to take up at great speeds an only partly unfolded position, a braking parachute so arranged and dimensioned as to be capable to assist effectively in retarding rapidly the initial speed to the value required to permit complete unfolding of the main parachute, a number of pull lines, said pull lines being fastened at their upper ends to the upper portion of the main parachute and being connected at their lower ends with the load, and elastic means included in said pull lines, said elastic means permitting the main parachute to take up its partly unfolded position at great speeds while positively causing the parachute to take up its fully unfolded position when the speed has fallen below a predetermined value.

2. A composite parachute as claimed in claim 1, characterized in that the pull lines proper are elastically yielding.

3. A composite parachute as claimed in claim 1, characterized by the provision of means for preventing stretching of the elastic means beyond a predetermined limit.

4. A composite parachute as claimed in claim 1, characterized in that springs, preferably helical springs, are inserted in the pull lines.

5. A composite parachute as claimed in claim 1, characterized in that the pull lines are connected with the load by means of a central suspension line in which a common spring is inserted.

6. A composite parachute as claimed in claim 1, wherein a central suspension line and helical spring are included, and the pull lines are connected with the load over said central suspension line by means of said helical spring which is threaded over the suspension line and operates as a compression spring.

7. A composite parachute adapted for release at great initial speeds comprising in combination, a harness attached to the load, a main parachute capable at great speeds of assuming only a partly unfolded position, a first system of suspension lines connecting the rim of said main parachute with said harness, a system of pull lines connecting the top portion of said main parachute with said harness, elastic means in said pull lines a braking parachute associated with said main parachute, a second system of suspension lines connecting said braking parachute with said harness, said braking parachute having sufficient dimensions to be capable of assisting effectively in rapidly retarding the movement of the load to a predetermined lower speed at which the main parachute is completely unfolded under the action of the elastic means.

8. A composite parachute as claimed in claim 7, wherein the suspension lines of the braking parachute are combined at their lower ends to form a common suspension line string.

9. A composite parachute as claimed in claim 7, wherein the pull lines of the main parachute are connected with the load by means of the suspension lines of the braking parachute.

10. A composite parachute as claimed in claim 7, wherein the pull lines of the main parachute consist of elastic tubular means which are threaded over the suspension lines of the braking parachute.

11. A composite parachute as claimed in claim 14 in which the main parachute has ring-shaped members and the suspension lines of the braking parachute are passed through said ring-shaped members, fastened to the top end of the following main parachute.

12. A composite parachute as claimed in claim 14, in which the main parachute has ring-shaped members and the suspension lines of the braking parachute are passed through said ring-shaped members fastened to the top end of the main parachute, the suspension lines being provided with stop members which, during unfolding of the braking parachute and before the lines have become fully stretched are drawn into engagement with the top end of the main parachute, so that the latter can be pulled out by the preceding braking parachute.

13. A composite parachute as claimed in claim 14, in which the main parachute has ring-shaped members and said ring-shaped members are included which slide along the suspension lines and by means of which after the pulling out and during the following unfolding the top end of the main parachute is guided by the suspension lines of the braking parachute.

14. A composite parachute comprising in combination a harness, a braking parachute, a system of suspension lines connecting said braking parachute with said harness, a main parachute capable of remaining at high speeds in an only partly unfolded position, auxiliary means connecting the top end of said main parachute with the suspension lines of said braking parachute to permit said braking parachute to pull said main parachute out of the pack into an elongated only partly unfolded position, and means for effecting a complete unfolding of said main parachute.

15. A composite parachute as claimed in claim 14, wherein the auxiliary means consists of auxiliary lines.

16. A composite parachute comprising in combination a harness, a main parachute having a top opening, a braking parachute, capable of reducing effectively the speed of fall, a system of suspension lines connecting said main parachute with the harness, a separate system of suspension lines connecting said braking parachute with the harness, a container for housing the parachutes and the suspension lines in a packed-up condition, means for disengaging the braking parachute from said container in advance of the main parachute, and auxiliary means connecting the braking parachute with the top of the main parachute so as to cause the main parachute to be pulled out of the container into an elongated and partly unfolded position, said auxiliary means being so devised as to allow the top of the main parachute to move up and down relatively to the suspension lines of the braking parachute after the main parachute having been pulled out.

17. A composite parachute according to claim 16 in which the auxiliary means connecting the braking parachute with the top of the main parachute is arranged so as to check the upward movement of the top of the main parachute.

18. A composite parachute according to claim 16, in which the suspension lines of the braking parachute are detachably connected with the top of the main parachute by means of a device adapted to automatically release the main parachute after its having been pulled out.

19. A composite parachute comprising in combination a harness, a main parachute having a top opening, a braking parachute, capable of reducing effectively the speed of fall, a system of suspension lines connecting said main parachute with the harness, a separate system of suspension lines connecting said braking parachute with the harness, a container for housing the parachute and the suspension lines in a packed up condition, means for disengaging the braking parachute from said container in advance of the main parachute, and ropes connecting the suspension lines of the braking parachute with the top of the main parachute so as to cause the main parachute to be pulled out of the container into an elongated and partly unfolded position, said ropes being of such a length as to allow the top of the main parachute to move up and down relatively to the suspension lines of the braking parachute after the main parachute having been pulled out.

20. A composite parachute comprising in combination a harness, a main parachute having a top opening, a braking parachute, capable of reducing effectively the speed of fall, a system of suspension lines connecting said main parachute with the harness, a separate system of suspension lines connecting said braking parachute with the harness, a container for housing the parachutes and the suspension lines in a packed-up condition, means for disengaging the braking parachute from said container in advance of the main parachute, auxiliary means connecting the braking parachute with the top of the main parachute so as to cause the main parachute to be pulled out of the container into an elongated and partly unfolded position, and means for effecting the complete unfolding of the main parachute by reducing the vertical distance between the base and the top of the main parachute.

AXEL RAOUL THÖRNBLAD.